K. F. COOPER.
PROCESS FOR HYDRATING COMMERCIAL CALCIUM CYANAMID.
APPLICATION FILED DEC. 1, 1914.
1,155,797.
Patented Oct. 5, 1915.
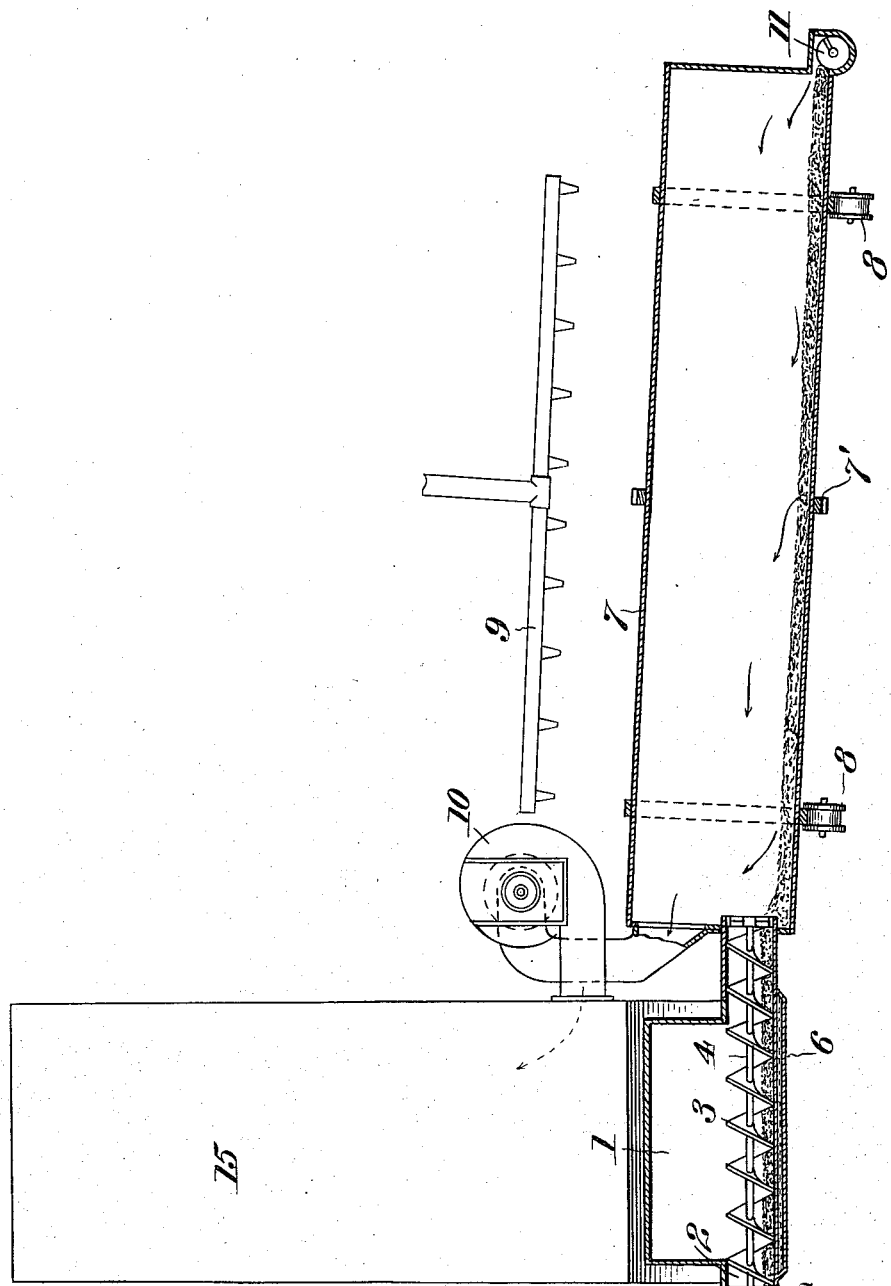

UNITED STATES PATENT OFFICE.

KENNETH F. COOPER, OF BUFFALO, NEW YORK, ASSIGNOR TO AMERICAN CYANAMID COMPANY, OF NASHVILLE, TENNESSEE, A CORPORATION OF MAINE.

PROCESS FOR HYDRATING COMMERCIAL CALCIUM CYANAMID.

1,155,797.     Specification of Letters Patent.     Patented Oct. 5, 1915.

Application filed December 1, 1914. Serial No. 875,040.

*To all whom it may concern:*

Be it known that I, KENNETH F. COOPER, a citizen of the United States, residing at Buffalo, in the county of Erie and State of New York, have invented certain new and useful Improvements in Processes for Hydrating Commercial Calcium Cyanamid; and I do hereby declare the following to be a full, clear, and exact description of the invention, such as will enable others skilled in the art to which it appertains to make and use the same.

This invention relates to a process for hydrating commercial calcium cyanamid and similar compounds and has for its object to accomplish this result in a simple and expeditious manner.

With these and other objects in view the invention consists in the novel steps constituting the process all as will be more fully hereinafter disclosed and particularly pointed out in the claims.

Referring to the accompanying drawings forming a part of this specification, and in which the figure is a diagrammatic partly sectional view of one form of apparatus suitable for carrying out the process, 1 indicates a feed opening through which the unhydrated cyanamid, or lime nitrogen, may be fed by any suitable means, and 2 any suitable mechanical mixer adapted to receive the material from opening 1, and to thoroughly agitate and mix the same. As shown, the mixer 2 is provided with the inclined paddles, or screw conveyer 3, mounted on a shaft 4, driven by a sprocket wheel 5, and 6 represents a water jacket associated with the mixer in order to prevent the temperature from rising so high as to liberate ammonia, or otherwise damage the lime nitrogen.

The mixer 2 delivers the material to the inclined horizontal cylinder 7, consisting of a shell of suitable size and adapted to be turned by the gear 7' and to rotate on the rollers 8 at such a speed that the material will remain in it for about thirty minutes.

9 represents a means for supplying water to the outside of the cylinder 7, in order to cool the same, and 10 represents a suction fan or blower for causing a forced draft through the cylinder.

11 represents any suitable delivering means from the cylinder.

A suitable means not shown, is provided for adding water to the charge in mixer 1.

In order that the invention may be more clearly understood it is said: Lime nitrogen or commercial calcium cyanamid, as it comes from the ovens contains varying amounts of calcium carbid, it being found in the process that it is not practical to carry the reaction between the carbid and the nitrogen to completion. The following is a typical analysis of raw material or unhydrated lime nitrogen, as it comes from the ovens: 3% calcium carbid, 57% calcium cyanamid, 18% calcium oxid, 12% free carbon, 5% calcium carbonate, 5% miscellaneous impurities, such as iron, alumina, silica. It is obvious that not only is this raw material not suitable without hydration for use in a complete fertilizer mixture under modern American practice, but it is also obvious that the large amount of calcium oxid present would through its automatic hydration render it impracticable to ship it. On the other hand if it is attempted to hydrate this raw material before shipment, it is evident that so much water could be used as to greatly injure the product, or so little water could be used as to fail to convert the calcium oxid into lime, so that it becomes a nice problem as to just how much and how little water should be employed to attain the best results. Again in dealing with large quantities, owing to the heat of hydration, a certain amount of water is inevitably driven off in the form of vapor and therefore is lost to the process of hydration. Accordingly, in carrying out the process, the raw lime nitrogen, as it comes from the furnace is analyzed, the total heat likely to be generated is considered as well as the temperature at which ammonium will be liberated, and the water is proportioned according to the amount of calcium oxid present. It has been found in practice that about 10 per cent. to 15 per cent. by weight of water should be added to the raw material to get the best results, as the amount of quick lime varies in different analyses. Further as is well known, the lime nitrogen both before and after hydration is composed of a very fine dust which is objectionable to the mixer as well as to the farmer. Accordingly, during the hydrating process, I add a small quantity of oil or other binding material to render the product more or less dustless as will now appear.

The raw or unhydrated lime nitrogen is fed through the feed opening 1, into the mixer 2, into which is also admitted the requisite quantity of water and about five per cent. (5%) of crude mineral oil, to act as a binder. The mixer thoroughly incorporates the water and oil into the lime nitrogen while the water jacket 6 prevents the temperature from rising so high as to cause ammonia to be given off, or otherwise injure the lime nitrogen. Any steam or acetylene gas that may be given off escapes up the stack 15. The now substantially dustless material is carried through the mixer at such a rate that any violent reactions will have subsided by the time it reaches the rotating cylinder 7. Here, it is constantly stirred or moved around, inside the cylinder against the action of gravity, which causes it to continuously fall in a loose powder and thus become thoroughly subjected to the action of the suction or draft maintained in said cylinder 7. In this manner the hydrated material may become sufficiently dried in a few minutes to permit its storage in bulk, or its shipment in sacks, and its uniform quality and condition is assured. In fact it is generally found desirable to carry the hydration to such a point that the finished material contains substantially no calcium carbid and substantially no calcium oxid, and the cooling through such a period that when room temperature has been reached all reactions have ceased. About 1% or 2% free moisture is generally found in the finished product.

It is obvious that those skilled in the art may vary the details of the process without departing from the spirit of the invention and therefore I do not wish to be limited to the above disclosure except as may be required by the claims.

What I claim is:

1. The process of hydrating fertilizer material containing in varying proportions calcium cyanamid, calcium oxid, and calcium carbid, which consists in thoroughly stirring said material while adding water thereto in predetermined quantities sufficient to hydrate the oxid and decompose carbid present and while maintaining the temperature too low to permit any substantial liberation of ammonia, substantially as described.

2. The process of hydrating fertilizer material containing in varying proportions calcium cyanamid, calcium oxid, and calcium carbid, which consists in thoroughly stirring said material while adding water thereto in predetermined quantities sufficient to hydrate the oxid and decompose carbid present and while maintaining the temperature too low to permit any substantial liberation of ammonia; subjecting said stirred and water treated material to a further agitation while removing the liberated gases and vapors; and cooling said material substantially to the room temperature, substantially as described.

3. The process of hydrating and rendering less dustless fertilizer material containing in varying proportions calcium cyanamid, calcium oxid and calcium carbid, which consists in thoroughly stirring said material while adding water and oil thereto, said water being added in predetermined quantities sufficient to hydrate the oxid and decompose carbid present and while maintaining the temperature too low to permit any substantial liberation of ammonia; and said oil being added in quantities too small to interfere with said hydrating action, yet sufficient to serve as a binder between the particles, substantially as described.

In testimony whereof I affix my signature, in presence of two witnesses.

KENNETH F. COOPER.

Witnesses:
 A. D. WHITTEMORE,
 RICHARD CARY.